UNITED STATES PATENT OFFICE.

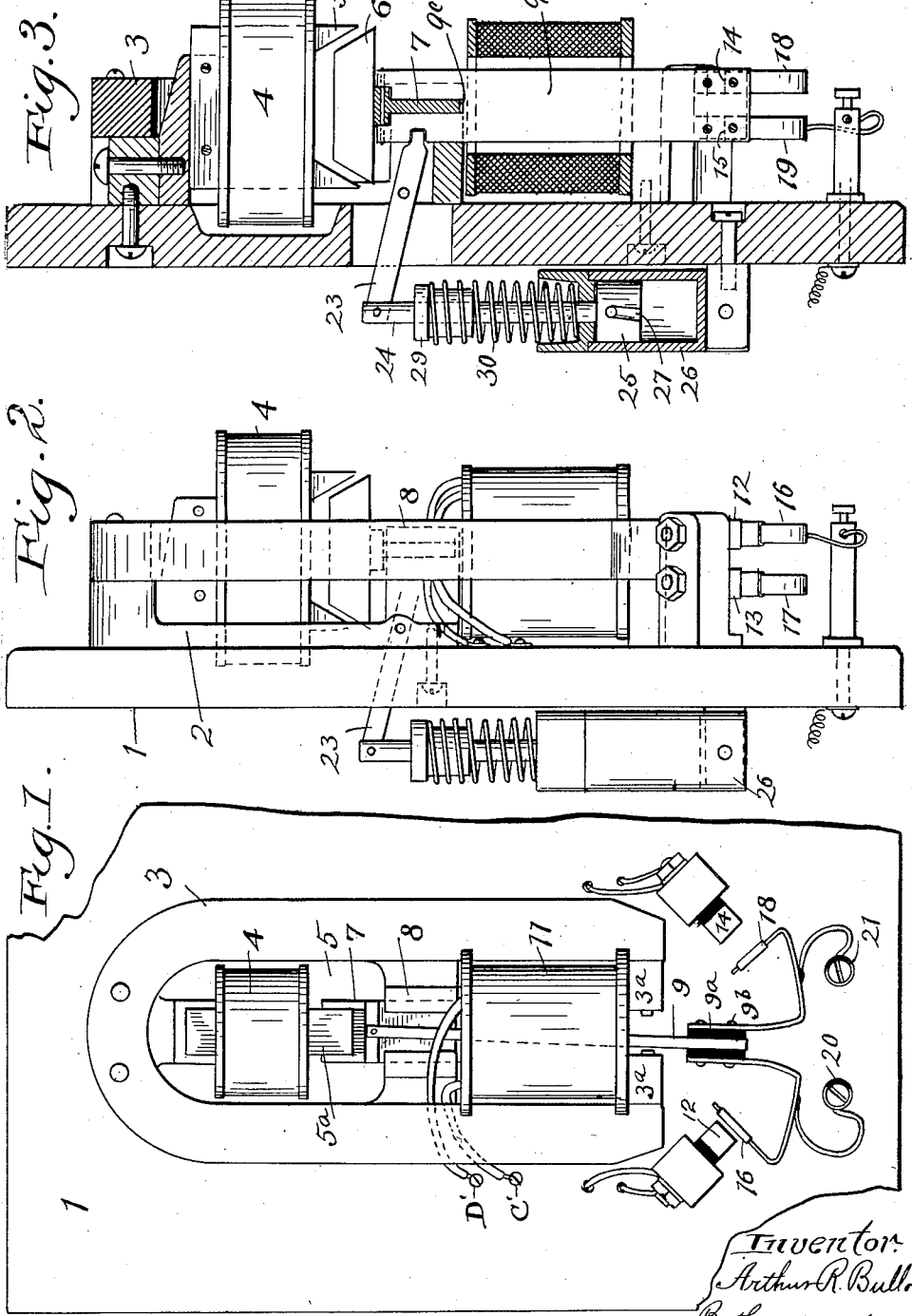

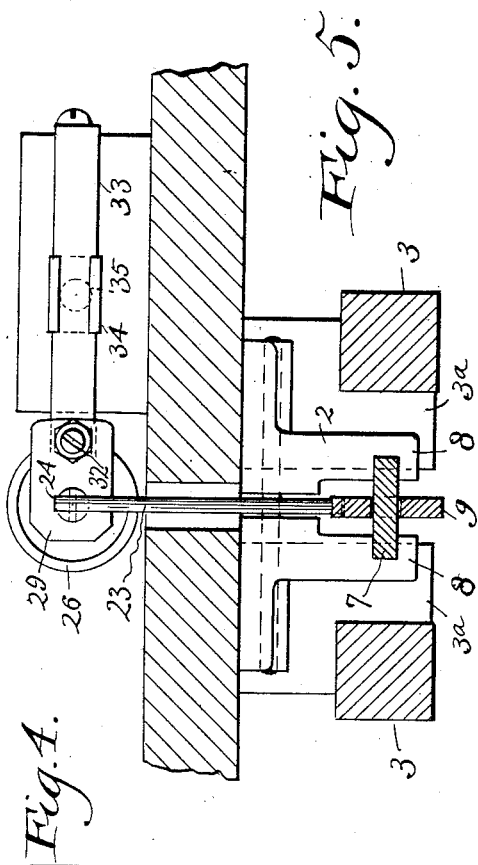

ARTHUR R. BULLOCK, OF LAKEWOOD, OHIO.

ELECTRICAL SYSTEM AND CONTROL THEREFOR.

1,375,486.   Specification of Letters Patent.   Patented Apr. 19, 1921.

Application filed August 2, 1917. Serial No. 184,018.

*To all whom it may concern:*

Be it known that I, ARTHUR R. BULLOCK, a citizen of the United States, residing at Lakewood, in the county of Cuyahoga and State of Ohio, have invented a certain new and useful Improvement in Electrical Systems and Controls Therefor, of which the following is a full, clear, and exact description.

This invention relates to an apparatus which is more particularly designed for use in connection with a machine for rectifying alternating current, and in addition to the device itself the invention includes an electrical system which includes a rectifying apparatus and coacting instrumentalities which will cause a sequence of operations that control the functioning of the rectifier when the circuit of the current to the rectifier is closed or opened, and which will further insure that the current rectified, shall always flow in the same direction from the output terminals of the machine.

In the term "rectifier" as used in the specification and claims, unless otherwise specified, is included rotary commutator rectifiers, vibrator rectifiers, motor generator sets, in fact, all those devices which when connected to an alternating current circuit as a source of power and operated, deliver unidirectional current.

Generally speaking, the invention may be said to comprise the elements and combinations thereof set forth in the accompanying claims.

Reference should be had to the accompanying drawings forming a part of this specification, in which Figure 1 is a front elevation of the apparatus of my invention; Fig. 2 is a side view of the apparatus; Fig. 3 is a side elevation with portions in section of the apparatus; Fig. 4 is a rear view with portions in section of the apparatus; Fig. 5 is a top plan view with portions in section of the apparatus; Fig. 6 is a diagram showing the manner in which the device of my invention may be used in connection with the operation of a rectifier machine.

In operating a rectifying machine it is desirable that the current which is delivered by the machine shall always flow in the same direction, particularly where the current rectified is to be used for battery charging purposes or motion picture arcs.

When otherwise uncontrolled, rectifying machines will always deliver unidirectional current, but it may happen that upon one operation of the machine positive current will flow from a given terminal of the machine, and in a subsequent operation of the machine positive current may flow from the other terminal.

Furthermore, in the operation of rectifying machines, particularly those which are operated by a synchronous motor, it is desirable that the synchronous motor shall have attained its synchronous speed before alternating current is fed to the rectifying device. This precaution insures proper rectification, and eliminates possibility of sparking or other difficulties which might be incident to rectification if the component parts thereof are not operating at synchronous speed.

Before describing the system in connection with which a device of the character herein described may be used, I will describe the construction of the apparatus of my invention. At 1 there is a suitable mounting or panel of insulating material, and upon one side thereof is a base member 2. To the base member there is attached a magnet 3 which is of the horseshoe type. This magnet has at its ends inwardly extending pole pieces $3^a$. Within the magnet 3 there is a coil 4. This coil is composed of relatively coarse wire. The coil is mounted upon a laminated core which is indicated at 5. The core has a V-shaped opening $5^a$ at the lower portion thereof and coöperating with the opening in said core is an armature 6 which is also laminated.

The armature 6 is mounted in a carrier 7, which slides in suitable grooves, as indicated at 8, which are formed upon the base member 2. At 9 there is indicated a long pendulous member which at its upper portion is recessed as indicated at $9^c$ to accommodate the lower portion of the member 7. The member 9 is pivoted to the member 7, so that it may swing with respect thereto, although any vertical movement of the member 7 will cause a similar vertical movement of the member 9.

The member 9 extends downwardly and passes through an opening in a coil of fine wire which is indicated at 11. The member 9 also extends between the poles $3^a$ of the magnet 3 forming in effect a polarized relay.

Mounted upon the member 1 and at one side of the magnet 3 is a pair of terminals which are indicated at 12 and 13. Upon the opposite side of the magnet 3 there is a like pair of terminals which are indicated by 14 and 15. At the lower end of the member 9 there are mounted a pair of flexible terminal members 16 and 17, and there is also an oppositely disposed pair of terminals indicated at 18 and 19. The terminal members are insulated from the member 9 by suitable insulating material 9ª, but the terminal member 16 is connected with the terminal member 18 through the rivets 9ᵇ by which they are secured to each other, and to the member 9.

Likewise the terminal member 17 is electrically connected with the terminal member 19, the terminal member 16 is connected by a flexible conductor with the terminal post 20, while the terminal member 19 is connected in a suitable similar manner with the terminal post 21.

The contact member 12 is connected through the back of the board by means of the conductor 12ª with the contact member 15, and the contact member 13 by means of the conductor 13ª connected with the terminal 14.

This construction is very similar to the construction of a two-way switch, and the real purpose of the construction thus described is to cause where necessary a reversal of the current between the rectifier and the output terminals of the machine, or in other words, to connect up the terminals of the rectifier with its output terminals in such relationship that the current will always flow in the same direction from those terminals.

By reference to Fig. 6, the coöperation of the contacts may be better understood, assuming that the various parts of the device are in proper position, i. e., the member 9 in elevated position, for the terminals 13, 12, to coöperate with the terminals 16, 17, or the terminals 15, 14, to coöperate with the terminals 18, 19.

When the coil 4 is energized and the depending member 9 which carries the contacts 16, 17, 18, 19, is elevated, the movement of the member 9 will unbalance the position of that member so that it will be attracted to either of the poles 3ª so that perchance the contacts 16, 17, might move into engagement with contacts 12, 13, or it might with equal chance happen that the contacts 18, 19, move into engagement with contacts 14, 15.

If we assume in the first instance that the contacts 16, 17, move into engagement with contacts 12, 13, and further assume that the current as it is delivered from the rectifying device at the terminals 20, 21, is positive at the terminal 20 and negative at the terminal 21, then the current would flow from the terminal 20 to contact member 18, thence to contact member 16, thence to contact member 12, and to the output terminal D of the rectifier, and by the same reasoning the terminal C would be negative. This passage of the current would be as desired for the terminals D and C have been previously determined as positive and negative respectively.

Let us assume under the same conditions, namely, engagement between contacts 16 and 17, and 12, 13, and that this time the current coming from the rectifying machine is positive at the terminal 21 and negative at the terminal 20. This would then mean that the current f m the rectifier would pass to the contact 17, thence to contact 13, and to the negative terminal C. This condition would be undesirable because it is desired to maintain the terminals D and C as positive and negative respectively; under these conditions current will flow through the coil 11 from the terminal 21 to the terminal 20. This coil is so wound that under those circumstances it will create a field of such polarity as to move the member 9 to engagement with the opposite pole 3ª of the magnet 3. In other words, it will break the engagement between contact member 16, 17, and 12, 13, and bring the contacts 18, 19, into engagement with the contacts 14, 15. Under these conditions the current will be flowing in the proper direction because current from terminal 21 would flow to contact 17, thence to contact 19, thence to contact 15, which is connected with the terminal D, while the terminal 20 which is negative will in like manner be connected with the terminal C. This will then bring the rectified current so far as external circuit is concerned outside the terminals D and C in the desired direction.

If we consider that upon starting the machine the contacts 18, 19, engage with contacts 14, 15, and that the current as sent from the rectifier is such that the terminal 20 is positive, it will be apparent that this connection would send the rectified current through the external circuit in the wrong direction. Likewise, it will be apparent that the current passing from the terminals 20, 21, through the coil 11, would be in a direction to build up a field so as to cause the member 9 to be attracted toward the opposite pole of the magnet 3, thus moving the contact 16, 17, into engagement with the contacts 12, 13, which would then cause the current in the external circuit to flow in the desired direction.

From the foregoing description it will be seen that the arrangement of movable contacts and of the coil 11 is such that the coil 11 will develop a field to move the member 9 so as to bring proper contacts into engagement to insure the flow of rectified current in the proper direction from the ultimate terminals of the rectifier.

There is a lever 23 pivoted upon the member 2, which lever engages at its forward end with the member 7. This lever at its rear end is secured to the piston rod 24 of the piston 25 within the dash pot cup 26. The piston is provided with a passageway 27 which extends around the piston, and there is a ball valve 28 which controls the passage of oil or other fluid which may fill the piston cup 26.

The piston rod carries a head 29 and between the head 29 and the upper part of the casing 26 of the dash pot there is a spring 30. The action of this dash pot is to slowly descend and quickly ascend. The dash pot head 29 carries an adjustable screw 32 which in its descent is adapted to engage a flexible member 33 which carries a contact 34. This contact is adapted to engage a contact 35, the contacts 34 and 35 forming the terminals for the A C circuit which includes the rectifying device and also the line transformer if the same be used to change the line voltage to the rectifying device.

The coil or coils as the case may be are connected in series with the motor which operates the rectifying device. Therefore, as soon as the alternating current is turned on the current will flow through the coils 4 energizing the coils thereby creating a magnetic field which will draw the armature 6 upward into the lower portion of the core 5. This operation will be slowly accomplished because it is done against the action of the dash pot, which as before stated, has a slow movement in its descent. This slow movement is sufficient to give the motor time to start, and come up to its synchronous speed.

As the armature 6 moves upward it carries the member 9 with it so that the contact members 16, 17, and 18, 19, are carried upward and are in proper position to coöperate with either set of terminals 12, 13, or 14, 15.

It should be here noted that the contact members are only in position to engage the contacts when the member 9 is in its elevated position. If the member 9 be not elevated, even though the coil 11 be energized, it would serve no purpose for the contact members 16, 17, and 18, 19, would not be in position to engage with the contact members 12, 13, and 14, 15. But when the member 9 has been raised in the manner described, these contact members are in proper position to coöperate.

At this time the contacts 34, 35, are closed, so that current is being supplied to the rectifying device.

As soon as the current is supplied to the rectifying machine, the rectified current will in part pass through the coil 11, for this coil is in shunt connection with the rectified current circuit. As before stated, the coil 11 will develop a field which will cause the member 9 to move either to one side or the other in accordance with the polarity which is developed by the coil 11. This then will have put the contact members thus far described in position to supply rectified current to the external circuit in a proper direction.

In the event that the motor circuit fail it is obvious that the current flowing through the coil 4 will cease, in which event the armature 6 will drop, carrying with it the member 9 and the contact members carried thereby. This will automatically break the connection between whichever set of terminals carried by the member 9 may be in engagement, and so will break the rectified current circuit. Furthermore, the downward movement of member 9 releases the engagement between contacts 34 and 35 and so opens the circuit from the A C circuit to the rectifier. The circuits will be quickly broken because the construction of the dash pot is such that it permits a quick return and the weight of the parts is sufficient to cause their quick movement to their lowest or most downward position.

While the invention has been explained with respect to a rectifier of the rotating commutator type driven by a synchronous motor, it will be apparent that other types of rectifier may be utilized as well as a motor generator set, in which the coil 4 is connected in series with the motor of the motor generator set and the coil 11 is connected in parallel with the unidirectional current put out by the generator.

Having described my invention, I claim:—

1. In an electrical system, an A C energizing circuit, a rectifier connected with said circuit, a pair of terminals for an external circuit, a circuit connecting the terminals with the said rectifier said circuit including fixed and movable contact members, engagement between which fixed and movable contact members closes the circuit from the rectifier to the terminals, a movable member which carries the said movable contacts, electro-magnetic means associated with said movable members and connected with the A C circuit whereby when the A C circuit is closed through the electro-magnetic means the movable contact members are brought into position to engage with the said fixed contact members and are moved out of said position to engage when the electro-magnetic means is not energized.

2. In an electrical system, an A C energizing circuit, a rectifier connected with said circuit, a pair of terminals for an external rectified circuit connecting the terminals with the rectifier, said circuit comprising fixed terminals, and movable terminals, the said movable terminals being normally out of position to engage with the fixed terminals, a movable member upon which the movable contacts are carried, an electro-magnetic device associated with said movable member, said electro-magnetic device being connected with the A C circuit, whereby when the circuit to the electro-magnetic device is closed and the electro-magnetic device energized, the movable contact members are moved to a position in which they may engage the fixed contact members and are moved to a non-engaging position when the electro-magnetic device is not energized.

3. In an electrical system, an A C energizing circuit, a rectifier, a circuit connecting the rectifier with the said A C circuit, a movable switch member in the rectifier circuit, a pair of terminals for an external circuit, a rectified circuit connecting the rectifier with the said terminals said rectified circuit containing fixed contacts and movable contacts, said movable contacts being normally out of position in which they may engage the fixed contacts, an electro-magnetic device associated with the movable contacts whereby when the electro-magnetic device is energized the movable contacts will be brought into position whereby they may engage with the fixed contacts the movement of the said movable contact members closing the switch in the rectifier circuit, the electro-magnetic device being connected with the A C circuit.

4. In an electrical system, an A C energizing circuit, a rectifier, a rectifier circuit connecting the rectifier with the A C circuit, movable contact members in the rectifier circuit, a pair of terminals for an external rectified circuit, a rectified circuit connecting the rectifier with the said terminals said rectified circuit containing fixed contact members and movable contact members, the movable contact members normally being out of position in which they may engage the fixed contact members, a movable member upon which the movable contact members are carried, an electro-magnetic device associated with said movable member whereby when the electro-magnetic device is energized the movable contact members are brought into position whereby they may engage with the fixed contact members, the electro magnetic device being connected with the alternating current circuit, means whereby the movement of the said movable member controls the closing of the rectifier circuit to the A C circuit through the movable contacts in that circuit.

5. In an electrical system, an A C energizing circuit, a rectifier, a motor for operating said rectifier, an electro-magnetic device, a circuit connecting the said motor with the A C circuit, and including the electro-magnetic device, a rectifier circuit for connecting the rectifier with the A C circuit said rectifier circuit including movable contacts, a pair of terminals for an external circuit, a rectified circuit connecting the rectifier with the said terminals said rectified circuit including fixed contacts and movable contacts said movable contacts being normally in a position to not engage the fixed contacts, a movable member by which the movable contacts are carried said movable member being associated with the electro-magnetic device whereby when the electro-magnetic device is energized, the movable contact members are moved into a position in which they may engage the fixed contacts, and means associated with the said movable member whereby the contacts in the rectifier circuit are moved to open or close said rectifier circuit to the A C circuit in accordance with the movement of said movable member.

6. In an electrical system, an energizing A C circuit, a rectifier connected with said circuit, a pair of terminals for an external circuit, a rectified circuit connecting the terminals with the said rectifier, said circiut including fixed and movable contact members, two pairs of stationary contact members which are diagonally oppositely electrically connected to each other, said contact members being connected to said terminals, movable contact members, a circuit connecting said movable contact members with the rectifier, a movable member upon which the movable contact members are mounted, said movable contact members normally being in the position of not engaging the fixed contacts, an electro-magnetic device associated with the movable member said electro-magnetic device being connected with the A C circuit, whereby when the electro-magnetic device is energized the movable contact members are moved into a position in which they may engage with the fixed contact members, a coil associated with the movable members on which the movable contacts are carried said coil being connected with the rectifier circuit from the rectifier whereby the movable contacts will be moved into engagement with that set of fixed contacts which will maintain the flow of current through the rectified circuit to the terminals always in the same direction.

7. In an electrical system, an A C energizing circuit, a rectifier connected with said circuit, a pair of terminals for an external circuit, two pairs of stationary contact members which are diagonally oppositely electrically connected with each other said contact members being connected with said terminals, a movable member, movable contact members carried by the movable member, an electro-magnetic device associated with the movable member said electro-magnetic device being connected with the A C circuit, and when energized moving the movable member so that the movable contacts are in position to engage with the fixed contacts, a coil associated with the movable member said coil being connected with the rectified circuit from the rectifier said coil causing a movement of the movable member to bring the movable contacts into engagement with that set of fixed contacts which will supply the terminals with rectified current always in the same direction, a circuit connecting the rectifier with the A C circuit said rectifier circuit including movable contacts, and means operable by the said movable member for operating the movable contacts to close or open the rectifier circuit.

8. In an electrical system, an energizing A C circuit, a rectifier, a rectifier circuit connecting the rectifier with the A C circuit said rectifier circuit including a circuit opening and closing device, a motor for operating the rectifier, a motor circuit connecting the motor with the A C circuit, said motor circuit including in series an electro-magnetic coil, a pair of terminals, two pairs of fixed contact members which are suitably connected with the said terminals, movable contact members, a movable member upon which the movable contact members are carried said movable contact members being normally in a position to not engage with the fixed contact members, a rectified circuit from the rectifier to the movable contact members, the movable contact members being moved into a position in which they may engage the fixed contact when the electro-magnetic coil in series with the motor is energized, a coil associated with the movable member said coil being connected in parallel with the rectified circuit, fixed poles associated with the last mentioned coil whereby when the coil is energized the movable contact members will be moved into engagement with that pair of fixed contact members which will supply the terminals with rectified current always in the same direction, the circuit opening and closing device in the rectifier circuit being operated by the movement of the said movable member.

9. A controlling device comprising a pendulous member which is pivoted near one end thereof said pendulous member being slidably mounted, magnetic means for causing the pendulous member to slide in its mounting, other magnetic means associated with the pendulous member and controlling the swinging motion of the pendulous member, oppositely disposed contact members carried by the pendulous member, oppositely disposed fixed contact members adjacent the movable contact members, and conductors electrically secured to the movable contact members and to the fixed contact members.

10. A controlling device comprising a pendulous member said pendulous member being pivoted adjacent one end thereof, means whereby the pendulous member is slidably mounted, electro-magnetic means mounted adjacent the pendulous member, an armature carried by the pendulous member whereby when the electro-magnetic means is energized the armature is attracted thereby to cause the pendulous member to slide, a second magnetic means associated with the pendulous member and adapted to control the swinging movement of the pendulous member, oppositely disposed contacts carried by the pendulous member, oppositely disposed fixed contacts adjacent the contacts carried by the pendulous member, and conductors electrically connected with the contact members carried by the pendulous member, and other conductors electrically connected with the fixed contact members.

11. A controlling device comprising a fixed magnet having poles, a coil associated with the magnet, a pivoted member associated with the coil and magnet, means for slidably mounting said pivoted member, an electro-magnetic coil associated with the movable member, the said electro-magnetic coil when energized serving to raise the pivoted member, contact members carried by the pivoted member, fixed contacts upon opposite sides of the movable member, the coil associated with the magnet when energized serving to move the pivoted member to bring the contacts carried by the movable member into engagement with either of the oppositely disposed fixed contacts.

12. In a controlling device, in combination, a fixed magnet having poles, a coil associated with said magnet, a pivoted member associated with the said coil and magnet, means for slidably mounting the said pivoted member, an armature carried by the said pivoted member and associated with the electro-magnetic coil whereby when the electro-magnetic coil is energized the pivoted member is raised, oppositely disposed contact members carried by the pivoted member, fixed contact members upon both sides of the pivoted member, the coil associated with the magnet when energized serving to cause the pivoted member to move the contacts carried by the pivoted member into contact with either of the fixed contacts.

13. In a controlling device, in combination, a fixed magnet having poles, a pivoted member extending between the poles, a coil associated with the magnet and with the pivoted member, means for slidably mounting the pivoted member, an electro-magnetic coil associated with the pivoted member whereby the pivoted member will be moved longitudinally when the electro-magnetic device is energized, a dash pot associated with the said pivoted member and dampening longitudinal movement of the pivoted member when moved by the electro-magnetic device said dash pot being constructed to freely move in the opposite direction, movable contact members carried by the pivoted member, fixed contact members upon opposite sides of the pivoted member, the coil associated with the magnet when energized moving the pivoted member in a direction to cause the movable contact members to engage with the contact members upon either side of the pivoted member.

14. In an electrical system, an energizing A C circuit, a rectifying device connected with said A C circuit, an electro-magnetic device connected with the A C circuit, a switching device said switching device being included in a circuit connected to the rectifier said switching device being controlled by the operation of the electro-magnetic device first mentioned.

15. In an electrical system, an energizing A C circuit, a rectifier connected with said circuit, a synchronous motor connected with the A C circuit, for operating the rectifier, a pair of terminals for the external unidirectional circuit, a rectified circuit between the rectifier and the terminals, a switching device having fixed and movable terminals whereby the current may be reversed in the rectified circuit, and means controlled by the motor circuit and the circuit between the rectifier and the terminals to operate the said switch whereby the rectified circuit is controlled.

16. In an electrical system, an energizing A C circuit, a rectifying device, a motor for operating said device said motor being connected with the A C circuit, an electro-magnetic device, in series in the circuit connecting the motor with the A C circuit, a switching device connected in circuit with the rectifying device, means whereby the switching device is controlled by the operation of the electro-magnetic device.

17. In an electrical system, an energizing A C circuit, a rectifying device connected with said A C circuit, a switching device, and electrical means controlling the movement of said switching device said electrical means being controlled in part by the A C circuit and in part by a circuit including the rectifier.

18. A pole changing device having a slidably mounted pendulous member, contacts carried by said pendulous member, a pair of stationary contacts located on opposite sides of the pendulous member which are diagonally oppositely electrically connected to each other, current controlled means for moving the pendulous member with a sliding movement, other current controlled means associated with the pendulous member for moving it about its pivot.

19. A pole changing device having a pendulous member, contacts carried by said pendulous member, a pair of fixed contacts carried on opposite sides of the pendulous member, which contacts are diagonally oppositely electrically connected to each other, said pendulous member normally being in position which does not permit the contacts on the pendulous member to engage with the fixed contacts, electrically controlled means for moving the pendulous member to a position where the contacts on the pendulous member and the fixed contacts may be moved into engagement and electrically controlled means for causing the pendulous member to move about its pivot.

20. A pole changing device comprising a slidably mounted pendulous member, contacts carried by the pendulous member, a pair of fixed contacts located on opposite sides of the pendulous member, the said fixed contacts being diagonally oppositely electrically connected, an electro-magnet associated with the pendulous member and adapted when energized to move the pendulous member with a sliding movement, a second electro-magnet associated with the pendulous member and adapted to cause it to move about its pivot.

In testimony whereof I hereunto affix my signature.

ARTHUR R. BULLOCK.